(12) United States Patent
Blanco Montejo

(10) Patent No.: US 7,610,860 B2
(45) Date of Patent: Nov. 3, 2009

(54) INTEGRAL TRAIN GUIDANCE SYSTEM: "CENTRAL ROLLING GUIDE BOX"

(75) Inventor: Roberto Blanco Montejo, Madrid (ES)

(73) Assignee: Movitrade Peninsular, S.L.U., Galapagar, Madrid (ES)

( * ) Notice: Subject to any disclaimer, the term of this patent is extended or adjusted under 35 U.S.C. 154(b) by 562 days.

(21) Appl. No.: 10/559,137

(22) PCT Filed: May 25, 2004

(86) PCT No.: PCT/ES2004/000237

§ 371 (c)(1),
(2), (4) Date: Nov. 28, 2005

(87) PCT Pub. No.: WO2004/106135

PCT Pub. Date: Dec. 9, 2004

(65) Prior Publication Data

US 2007/0089635 A1    Apr. 26, 2007

(51) Int. Cl.
*B61F 13/00* (2006.01)
(52) U.S. Cl. ............... 104/139; 104/124; 104/243; 104/245; 105/72.2
(58) Field of Classification Search ........... 105/72.2, 105/215.1, 215.2, 216, 155; 104/126, 125, 104/124, 139, 242, 243, 245, 247, 281, 282, 104/165, 130.07, 94, 142, 143
See application file for complete search history.

(56) References Cited

U.S. PATENT DOCUMENTS

| | | | | |
|---|---|---|---|---|
| 2,115,466 A | * | 4/1938 | Newton | 105/166 |
| 2,215,475 A | | 9/1940 | Maher | |
| 3,077,165 A | * | 2/1963 | Vittorelli | 104/247 |
| 3,540,380 A | * | 11/1970 | Tumpak et al. | 104/246 |
| 3,955,895 A | * | 5/1976 | Raimbault | 403/340 |
| 4,919,054 A | * | 4/1990 | Matsuo | 104/94 |
| 6,298,791 B1 | | 10/2001 | Collins et al. | |

FOREIGN PATENT DOCUMENTS

| | | |
|---|---|---|
| ES | 8405326 | 9/1984 |
| FR | 821.252 | 12/1937 |
| WO | 00/53480 | 9/2000 |
| WO | 03/008252 A1 | 1/2003 |

* cited by examiner

*Primary Examiner*—Mark T Le
(74) *Attorney, Agent, or Firm*—Merchant & Gould P.C.

(57) ABSTRACT

Guide track made up of two wide wing I-shape profiles oriented in parallel and separated by a distance of 500 mm. Central rolling guide box, a set of four vertical axis wheels located at the ends of two steel bars intersecting and forming a cross-shaped device. The assembly is located between two steel plates measuring 700×400×25 mm, forming a box from which the guide wheels protrude laterally to rest tangentially on the web of the guide track profiles. Pivoting anchor cylinder with a dual function: anchoring of the box below the vehicle and transmission of box rotation for orientation of the support wheels.

16 Claims, 10 Drawing Sheets

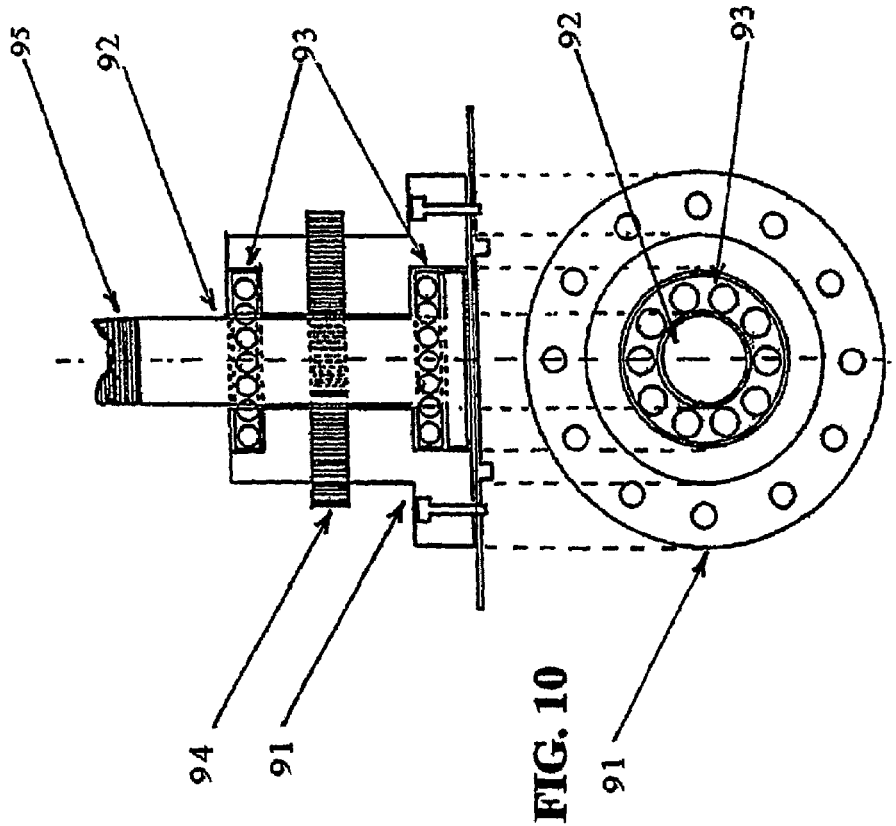
FIG. 9
FIG. 10 a)

b)

c)

a)

b)

c)

INTEGRAL TRAIN GUIDANCE SYSTEM: "CENTRAL ROLLING GUIDE BOX"

BACKGROUND

With a view to defining the technical sector in which it might be applied within the overall field of rail transport, it would first be advisable to briefly look at traditional guidance systems.

A guidance system most widely used since the onset of the railway, and the most widespread universally, is the so-called "flanged wheel", characterised by the fact that the supporting wheels—drive wheels or otherwise—perform a dual function: vehicle support and guidance.

The trunco-conical wheel has a three centimeter flange that runs along a guide rail and prevents derailing from occurring. This is, and has traditionally been, the most widely used system in railways across the world, regardless of gauge.

Another group of guidance systems is characterised by the supporting wheels being separated or disassociated from the guidance function. Support and guidance are carried out by way of independent mechanisms. In this group the different systems may be classified in two classes:

a) Lateral guidance systems, in which guidance is achieved by means of lateral bands or guides located on either side of the train. These bands or rails, located parallel and external to the wheels, imply a complicated and excessively visible installation.

b) Central guidance systems, in which guidance is achieved by means of one or two guides located beneath the centre of the train and at different heights with respect to the theoretical or actual axis of the wheels.

The central guidance system constituting the invention for which the patent is sought is to be included under this second group b), in order to define the sector in which study is to be undertaken for the mandatory "Technical status report".

A comparative study of the systems currently in operation allows us to state that current central guidance mechanisms might be improved upon through the application of significant innovations, and it is with this objective that we present the "CENTRAL GUIDANCE ROLLING BOX", which aims to overcome the technical problem dealt with above by disassociating the functions of support and guidance that were previously linked in the flanged wheel, and that required the installation of a dual guidance mechanism acting independently on either side, with the disadvantages that this meant and that were underlined in describing the systems in the previous section.

Orienting the vehicle box and guidance of the wheels simultaneously implied serious difficulties that have been efficiently resolved in this case by integrating the guide mechanisms for both sides in a single solid unit, which is described below.

SUMMARY

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

Embodiments described herein relate to integral guidance systems that simplify and improve the procedures used to date.

As discussed herein, an aspect of some embodiments relates to an integral train guidance system including at least three mechanical assemblies making up a train guidance transport infrastructure. The mechanical assemblies include a guide track defining first and second spaced apart and opposing guideways each having a limiting wall, a central rolling guide box sized to be positioned between said guideways and having rotary wheels opposing each of said limiting walls of said guide track, and a wheel anchoring and orientation cylinder for securing said central rolling guide box to a vehicle. The first and second spaced apart and opposing guideways are two I-shape steel profiles each having upper and lower wings. Each wing has a length the same as a length of the limiting wall. The guide track provides vertical and horizontal support for anti-derailing and anti-tilt mechanisms of the rolling guide box in a single element and provides maximum resistance to torsion and bending stresses. The lower wings of the profiles fit into recesses made in wings of two I-shape steel joists, oriented in parallel, with a separation between the limiting walls and located perpendicular to the guide track. Said two joists are joined by two steel plates located parallel to the track and at its outer part and braced by two steel plates having same dimensions that intersect diagonally in a cross shape. The device is a very solid rectangular structure that ensures that an unvarying distance is maintained between the profiles of the track, keeping these profiles parallel one with respect to the other.

Another aspect of some embodiments relates to an integral train guidance system including at least three mechanical assemblies making up a train guidance transport infrastructure. The mechanical assemblies includes a guide track defining first and second spaced apart and opposing guideways each having a limiting wall, a central rolling guide box sized to be positioned between said guideways and having rotary wheels opposing each of said limiting walls of said guide track, and a wheel anchoring and orientation cylinder for securing said central rolling guide box to a vehicle. The central rolling guide box acts as an interface between the guide track and the guided vehicle. The central rolling guide box is a modular structure including a set of four wheels or rollers with internal axial bearings, vertical axes of which are attached to yokes located at ends of two horizontal steel bars or shafts crossing or articulated via a central shaft as diagonals of a square or rectangle, said square or rectangle positioned between two rectangular steel plates holding five vertical shafts of the rolling box including one central shaft and four guide wheel shafts. The guide wheels including two on either side protrude laterally various centimeters from the steel plates including upper and lower plates and rest tangentially on the limiting wall of the parallel I-shape profiles that make up the guide track. With a height of the central rolling guide box less than that of the limiting wall of the track profiles, the central rolling guide box is anchored centrally below the vehicle at an equal distance from the supporting wheels.

Further aspects relate to an integral train guidance system comprising at least three mechanical assemblies making up a train guidance transport infrastructure. The mechanical assemblies including a guide track defining first and second spaced apart and opposing guideways each having a limiting wall, a central rolling guide box sized to be positioned between said guideways and having rotary wheels opposing each of said limiting walls of said guide track, and a wheel anchoring and orientation cylinder for securing said central rolling guide box to a vehicle. Said wheel anchoring and orientation cylinder is a dual-effect mechanism including an anchoring or attachment of the central rolling guide box to the vehicles, an orientation of the wheels, and a central bore for the pivoting axis, which is centred by means of two axial bearings, at the lower end of said bore there is a flange for bolting to the upper plate of the rolling box, such that the latter rotates along with the cylinder around the pivoting axis.

BRIEF DESCRIPTION OF THE DRAWINGS

The description of the different components of the system provided above is complemented with a series of drawings providing orthogonal and axonometric projections aimed at facilitating understanding of its structure and operation.

FIG. 9 is a front cross-section showing a rotating anchoring sub-system of the exemplary integral train guidance system;

FIG. 10 is a top view of the rotating anchoring sub-system shown in FIG. 9;

DETAILED DESCRIPTION

Figure 1:
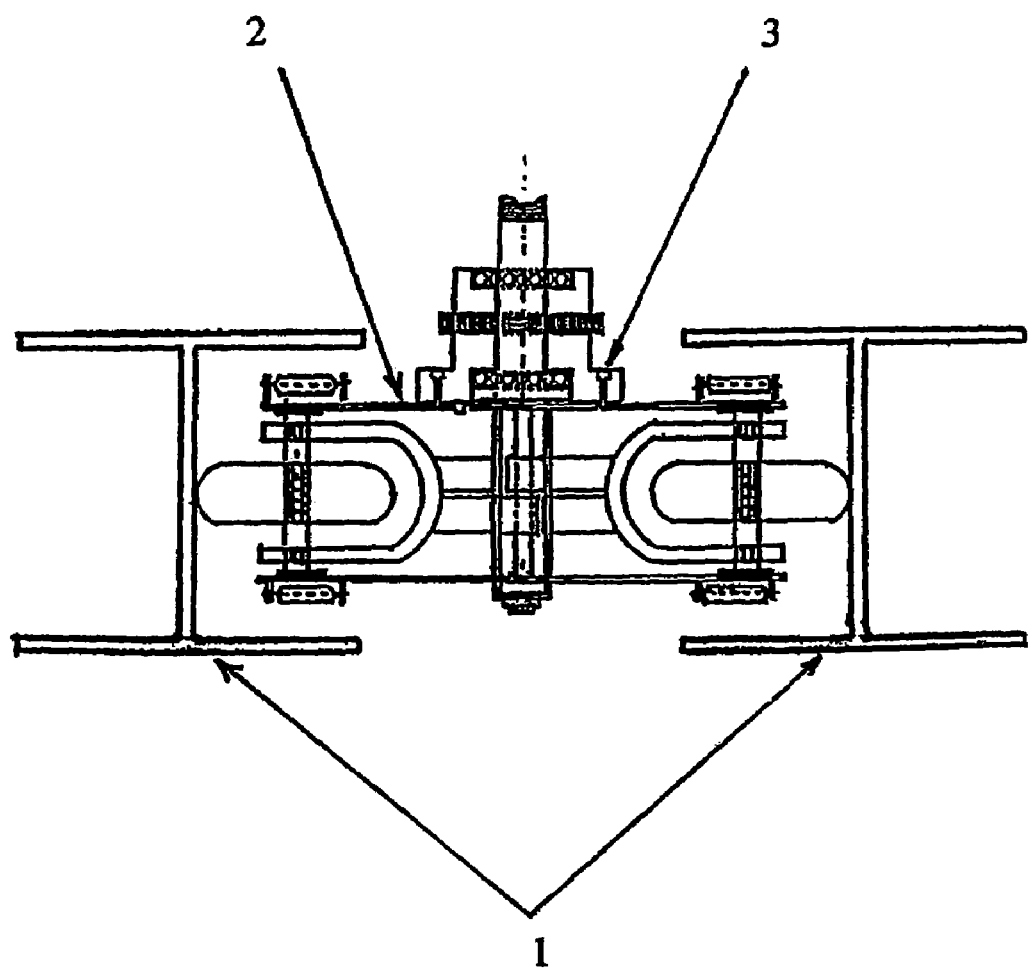
FIG. 1 is a front cross-section of an exemplary integral train guidance system according to a possible embodiment of the present disclosure.

The invention is generically described as being an integral system because it provides overall coordination for three mechanical assemblies that form a guided transport infrastructure, as shown in FIG. 1. The three mechanical assemblies typically include a guide track 1, a rolling guide box 2, and a rotating anchor cylinder 3. The guide track 1 is a circulation platform. The rolling guide box 2 is a guidance mechanism. The rotating anchor cylinder 3 is for securing the rolling guide box 2 to a vehicle.

The main mechanism is the rolling box system, which operates as an interface between the vehicle and the platform on which it runs (guide rail). Although the three parts are structurally independent, their operation is necessarily complementary, for which reason they are described below in a stepwise manner in order to clearly explain their characteristics.

Guide Track

Figure 2:
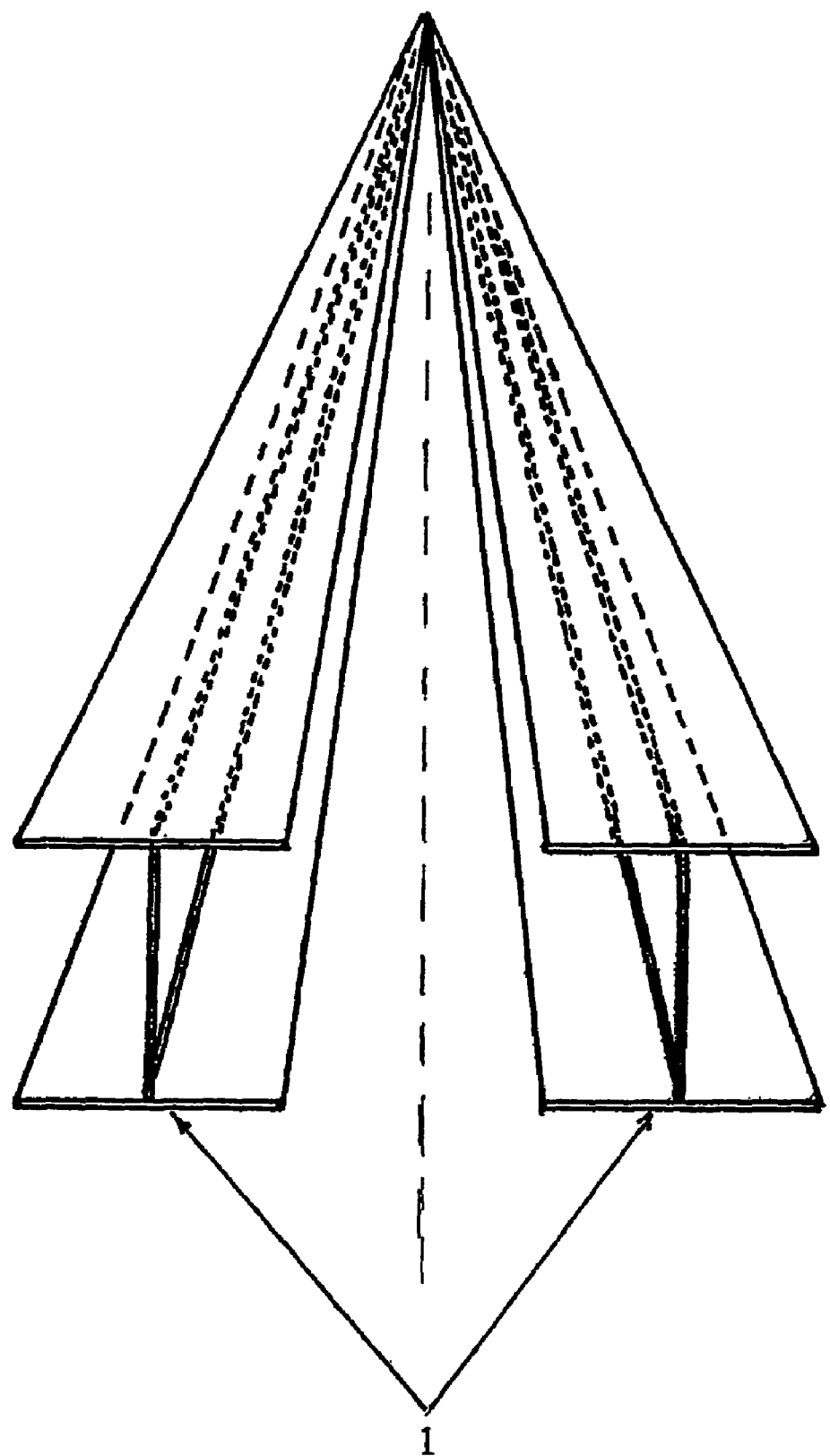
FIG. 2 is a central conical perspective view of the exemplary integral train guidance system.

Basically, a guide track 1 is made up of two double-T (i.e., I-shape) steel profiles or girders with wide wings measuring 260 mm, located parallel and separated by a distance of 500 mm between their webs, as shown in FIG. 2.

The mechanical efficiency of this system for use as the lateral rails of a guide track 1 typically arises from the following factors: physical characteristics, position, and coupling. With regard to the factor of physical characteristics, the material composition may be made from very hard steel. Double-T shaped profiles are provided. In addition, an angular arrangement provides maximum resistance to torsion and bending stresses. As for the dimension, a wide wing has a length identical to that of the web of the girder (e.g., 260 mm). The wide wing provides a surface area sufficient to support the rolling box anti-derailing and anti-tilt mechanisms.

Figure 3:
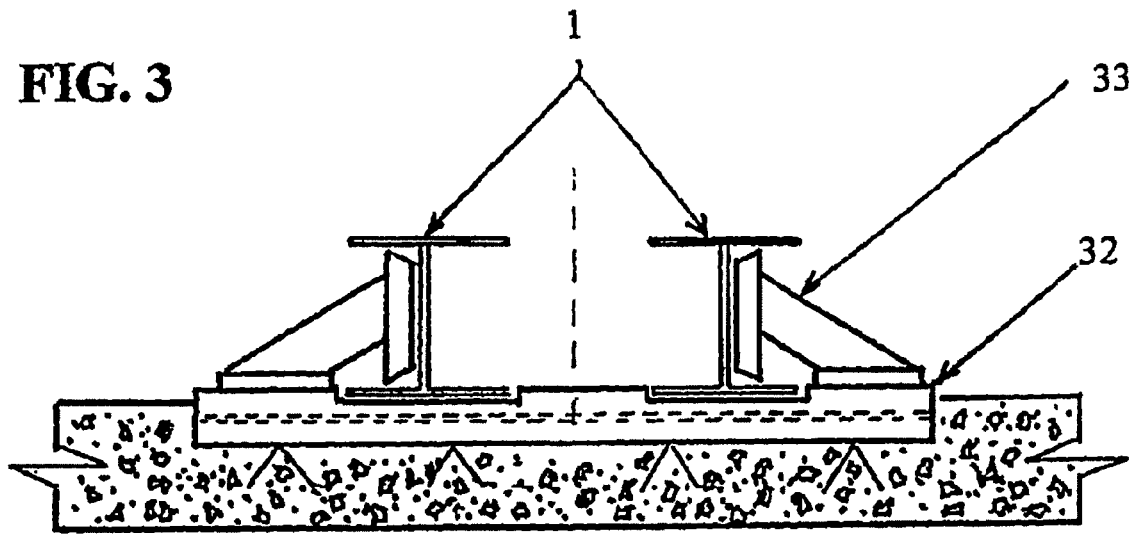
FIG. 3 is another front cross-section showing a track seating and attachment system of the exemplary integral train guidance system.
Figure 4:
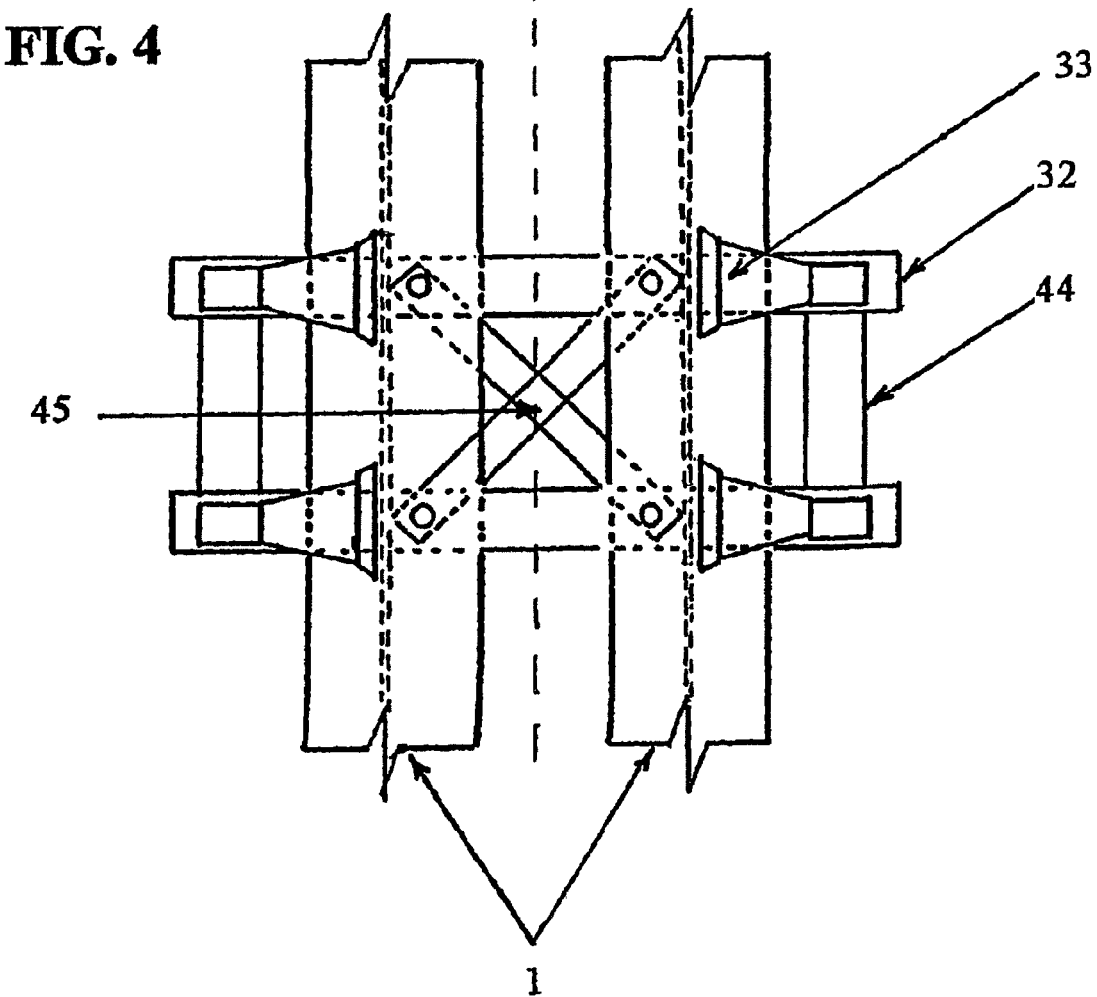
FIG. 4 is a top view of the track seating and attachment system shown in FIG. 3.
Figure 5:
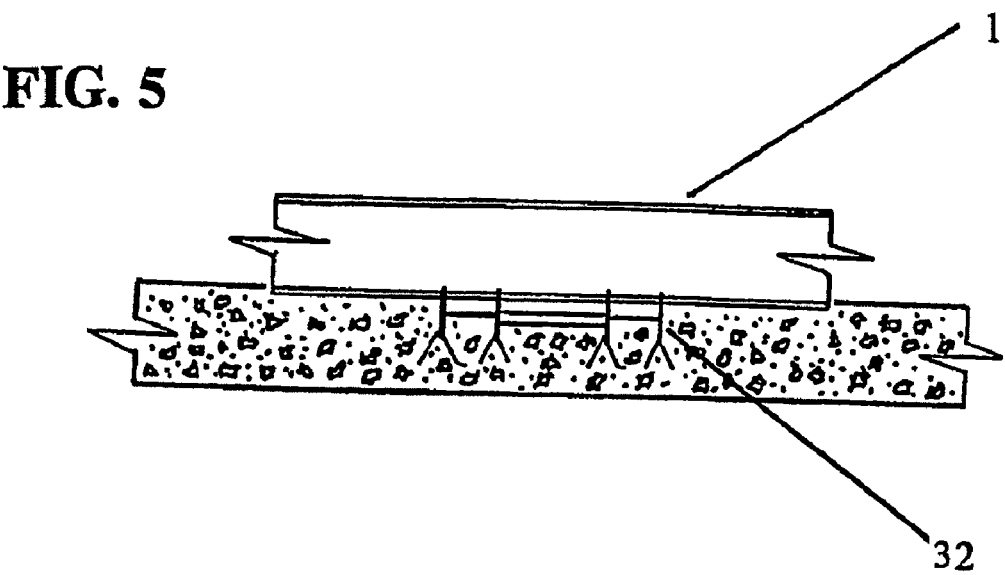
FIG. 5 is a side cross-section of the exemplary integral train guidance system.

With regard to the factor of position, the two girders are to remain parallel, with the web positioned vertically with respect to the rolling track. For example, parallelism is achieved by having the lower wing of the profiles engaged and attached within the seating and anchoring structure, as shown in FIG. 3 and detailed below. The lower wings of both profiles fit exactly into recesses made in the wings of two parallel double-T steel joists 32 measuring 100 mm, separated by 600 mm and oriented perpendicular to the guide track 1, as illustrated in FIG. 5. These two joists 32 are joined by two steel plates 44 located behind them and parallel to the track 1, as illustrated in FIG. 4. This forms a rectangle that will be internally braced by two steel plates 45 measuring 100 mm in width crossing diagonally in the centre and forming an X.

The aforementioned device is a particularly solid rectangular structure that ensures equidistance, thus keeping the profiles of the track 1 perfectly and permanently parallel.

The structure discussed above is kept in the vertical position by means of four tapered or triangular steel stops 33 (two on each transverse joist) that seat horizontally on the transverse joists 32 and rest vertically on the outer face of the guide track web, as illustrated in FIGS. 3 and 4.

The parallelism and verticality elements allow for quick and accurate adjustment of the guide track 1 on the supporting platform, with maximum savings in time and materials.

With regard to the factor of coupling, the continuity of the guide track 1 is achieved by joining various elements or sections (rails or profiles) of easily handled and transported lengths. This joining feature thus allows any length of track to be built.

Figure 6:
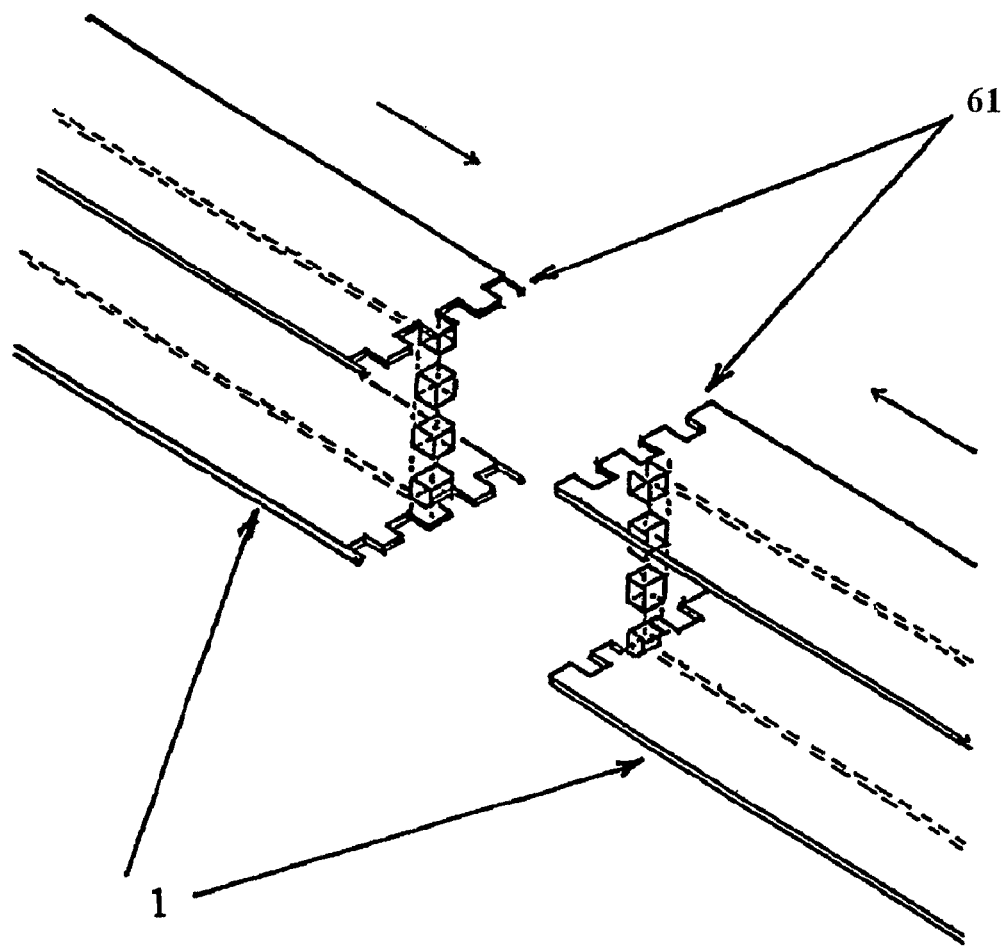
FIG. 6 is an isometric perspective view of the exemplary integral train guidance system showing a guide rail section and a detail of tonguing and grooving of the edges of the profile allowing for engagement without welding.

In the system described here, the different sections are joined or coupled by tonguing and grooving the ends 61 of the double-T profiles that form the guide track 1, as shown in isometric perspective in FIG. 6. This type of joint provides maximum security, since it completely prevents the sections from being separated in the transverse direction (horizontally and vertically), such separation being possible only by applying traction longitudinally. This characteristic is particularly important since it opposes the forces that might cause tipping or derailing by acting transversally on the guide track.

The coupling mechanism described allows the track to be quickly assembled and reinforces the parallelism and verticality of the structure without the need for welding or coupling elements to join the numerous double-T profiles of which it is made up.

Central Rolling Guide Box

Figure 7:
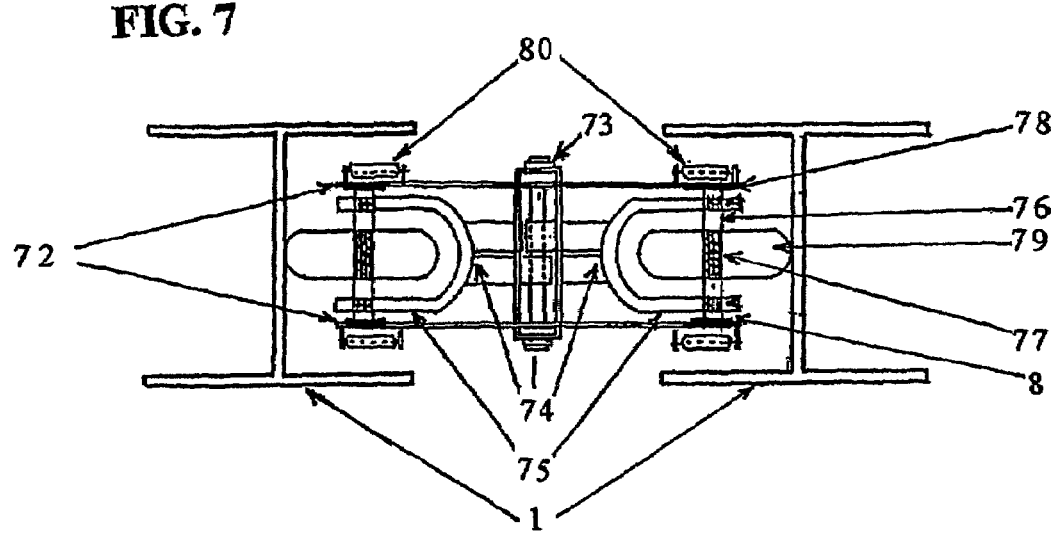
FIG. 7 is a front cross-section of a central rolling guide box system of the exemplary integral train guidance system.
Figure 8:
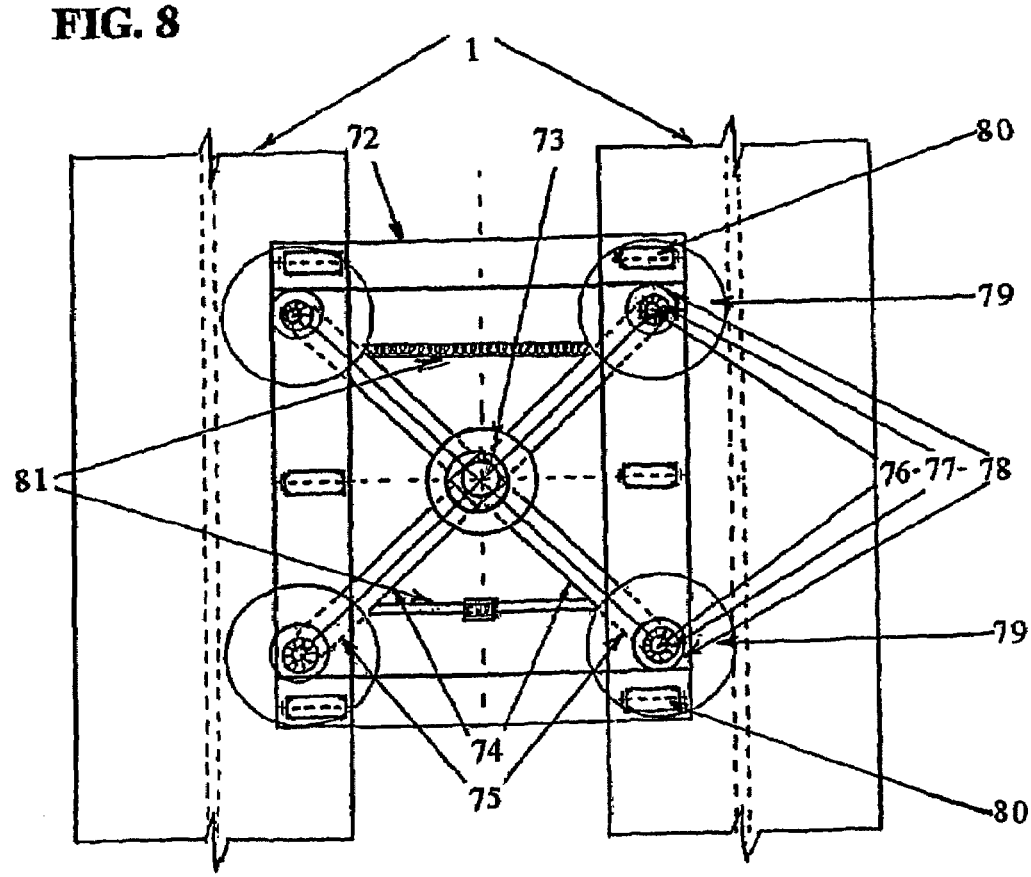
FIG. 8 is a top view of the central rolling guide box system shown in FIG. 7.

Referring to FIGS. 7 and 8, a central rolling guide box 2 typically includes a set of four wheels (or rollers) with internal bearings, the vertical axes 76 of which are located at the ends of two horizontal steel rods 74 that cross or are articulated via a central shaft 73, thus forming the diagonals of a square at angles of 90 degrees.

This mechanism will be positioned between two steel plates 72, forming a box-like structure performing a triple function: complementary attachment of the vertical axes of the guide wheels, centering of the horizontal steel axes or rods at the crossover point, and anchoring of the whole by attaching the box to the bogie joining the support wheels of the train.

Geometrically, the square at whose corners are located the guide wheel axles is positioned within a rectangular steel plate 72 measuring 700 mm by 500 mm, the longest sides of which are parallel to the guide track 1, such that the wheels 79 are covered at the front and rear. The height of the box 2 must be less than that of the web of the guide track profiles (260 mm), measuring approximately 210 mm, as shown in FIG. 7.

The guide wheels 79 (two on either side) protrude laterally various centimeters from the steel plates 72 (upper and lower), resting tangentially on the web of the two parallel double-T girders that make up the guide track 1.

The anti-tilt rollers 80 are located against the outer face of the upper and lower plates 72 of the rolling box 2 and come into contact with the wings of the guide track profiles only in the event of excessive inclination of the vehicle, thus avoiding sudden rubbing and tipping. The number of these rollers 80 may vary, six having been shown on each plate in FIG. 8.

The anchoring for the rolling box assembly 2 is located centrally below the vehicle, equidistant from the supporting wheels and at a different height with respect to them depending on the traction system.

The system described is shown graphically in the drawings attached hereto and its characteristics are detailed below.

Each of the guide wheels 79 on one side is linked to the one on the opposite side by means of a shaft 74 that crosses the shaft supporting the other pair of guide wheels 79 at right angles. In this way, the forces transmitted or withstood on directing the forward movement of the vehicle are balanced and compensated.

The complementary attachment of the upper and lower plates 72 of the box 2 increases the accuracy and strength of the positioning of the guide wheel axles by means of a dual effect: "isostatic" (identical location) and "isodynamic" (identical pressure on both sides).

This is an integral, compact and non-deformable assembly, a type of modular box open laterally and with two guide wheels on either side.

The modular design of the structure allows one or two modules to be installed for each bogie or support wheel axle (even independently). By duplicating the number of guidance points (eight guide wheels, four on either side) the firmness of the guidance is increased, this being especially intense at high speeds.

The anchoring system used for the assembly and the small dimensions of the rolling box provide for a high degree of flexibility as regards the height at which it is installed, with respect to the floor of the coaches and the rolling surface. The structure may be assembled at three levels:

a) Below the rolling surface: the guide rails (track) would be positioned below the surface, in a trench or slot.

b) Above the rolling surface but below or at the same height as the support wheel axle or bogie.

c) At a position higher than the theoretical axis (there is no physical axis) of the independent support wheels.

This flexibility in the anchoring system used provides a high degree of compatibility with all types of guided transport vehicles and any type of drive system or wheels (metallic or tyres).

The guide wheels 79 protrude laterally various centimeters from the upper and lower plates 72 and rest tangentially on the web of the guide track double-T girders 1. Rollers may also be used. The difference between the rollers and the wheels is that although both—wheels and rollers—are cylindrical, in the case of the rollers the height of the cylinder is greater than the diameter of the base. This provides a larger contact and guidance surface. The diameter of the wheels must be greater than 150 mm, and their thickness greater than 50 mm.

The material used for the wheels 79 may be metallic, plastic or ceramic, depending on the degree of hardness and elasticity considered to be most appropriate.

The modular structure integrates the different elements of the system in a single assembly and allows for multiple applications without having to increase the dimensions of the box (700×400 mm) or the width of the track (500 mm between double-T girders) to reinforce the guidance effect. The installation of two boxes per pair of support wheels is more efficient.

The central shaft 73 is a thick steel cylinder measuring 70 mm that centres and holds the two rings of the horizontal support axes 74. The cylinder is tapered at its upper and lower ends and forms a prism with a square base that inserts exactly into a perforation having the same shape and dimensions as the steel plates of the box 2.

This prism extends also into a threaded stem that protrudes from the plates as the bolt of a strong hexagonal nut that blocks the overall assembly.

The vertical guide wheel axes 76 have a double anchor, at the arms of the yokes 75 located at the ends of the horizontal support axes and at the upper and lower plates 72 of the box 2.

The wheels 79 rotate on the vertical guide wheel axes 76 by means of axial bearings or ball races 77, which remain fixed with their ends housed in the yokes 75 and plates 72. As in the case of the central shaft 73, these are tapered and end in the form of a prism with a square base and a threaded stem fitted with a hexagonal nut.

It is important to point out that the housing for the axes on the plates 72 includes a damper 78 in the form of an elastic ring or homokinetic gasket designed to absorb whatever dilations or vibrations might occur.

A pressure regulating and constant adherence mechanism 81 includes a rod fitted with an intermediate screw that allows it to be lengthened or shortened by millimeters. It is located between two arms bearing the guide wheels 74 the scissor movement of which (limited by stops) allows for a minimum deviation of the angle of 90 degrees, which translates into a variation of the distance between the points of tangency of the wheels on either side.

A deviation of 0.5 degrees is equivalent to 2.7 mm, and 2.5 degrees to a distance of 1.4 mm between points of tangency, this implying sufficient tolerance to compensate for the dilation or wear of the guidance materials, without this varying the pressure, since the regulating screw compensates for whatever variations might occur.

At the opposite angle and at the same distance between axes a spring or damper is fitted, this maintaining the guide wheels in constant contact with the guide track.

This mechanism might be replaced by an automatic pressure regulating arrangement, consisting of installing two variable pressure telescopic dampers with two springs, similar to those used in automobiles.

The central rolling guide box model described herein is the only system that simultaneously compensates and balances the pressure and adherence of the four guide wheels through a single modular mechanism. This is an extraordinarily robust assembly and is subjected only to transverse guidance forces, since it does not bear the weight of the vehicle. Its small size and the ease with which it is assembled and removed allow rolling box overhauls, repairs and greasing and cleaning tasks to be carried out rapidly.

Rotating Anchor Cylinder

The different possible anchoring models are complementary to the main mechanism of the rolling box system. A distinction may be made between two different groups, depending on the effects of the guidance provided: a) rigid or semi-rigid anchoring, and b) rotating anchoring (pivoting). The rigid anchoring system obliges the vehicle to follow the trajectory mapped out by the rolling box, without orientation of the axles or support wheels. The semi-rigid anchoring system allows for a slight rotating movement of the box-axle-wheels assembly, without orientation of the support wheels. Neither of these models is a sub-system of the rolling box system. Both are mechanisms involved in its installation, without autonomous effects.

The rotating anchoring system may be considered as being a sub-system in the strictest sense, and allows the guidance effects of the rolling box to be optimised, as explained below.

The mechanism of a rotating anchoring system transmits the rotation movement of the rolling box to the support wheels, on adapting to the guide track. The guidance effect is similar to that of the steering of an automobile. As illustrated in FIGS. 9 and 10, the mechanism is typically made up of three basic components: an anchoring and orientation cylinder 91, a central shaft or anchoring pivot 92, and a circular toothed collar or rack 94.

The anchoring and orientation cylinder 91 is a robust piece of steel that is perforated centrally to allow the anchoring pivot or shaft to pass through it. It is firmly attached to the upper plate of the rolling box by means of bolts.

The central shaft or anchoring pivot 92, around which the orientation cylinder 91 rotates, rests on two bearings 93 located at the upper and lower parts of its interior. The lower end of the shaft 92 has a flange on which the bearing rests, and its upper end 95 is threaded or milled to allow for its attachment to the vehicle frame or shaft and for height regulation.

The circular toothed collar or rack 94 is located on the outer face of the orientation cylinder 91 at a height suitable for it to engage with the support wheels orientation mechanisms (pinion, worm gear or toothed wheels).

The objective of the mechanism is to convert the circular movement of the rolling box 2 into a linear movement by means of the orientation cylinder 91, the toothed collar 94 of which acts on a set of gears, rods and swivels that move the spindles of the support wheels for the latter to rotate around their vertical diameter.

At this juncture it should be pointed out that the orientation of these wheels is achieved by means of two mechanisms that are functionally complementary but different in their construction: a) a pivoting anchor mechanism, and b) a wheel steering mechanism. The pivoting anchor mechanism transmits the rotation movement of the rolling guide box 2 and is a technically original and patentable assembly. This mechanism engages by means of the toothed collar with the wheel steering mechanism. The wheel steering mechanism includes a set of parts indicated above and make up the system generally used by automobiles.

The pivoting anchor cylinder is the reference mechanism for measurement of the angle of deviation of the rolling guide box with respect to the longitudinal axis of the vehicle. Theoretically, the bodywork or chassis of trains follows a linear path that adapts progressively to curves in a more or less obligatory manner depending on the guide track (double rail or monorail).

In the central rolling guide box system, the angle of deviation of the support wheels with respect to the longitudinal axis of the vehicle must be equal to the angle of deviation of the guide box. Deviation of the wheels (orientation) is achieved by means of the rotation of the anchor cylinder that connects to the wheel steering mechanism, the parts of which form an articulated trapezium that acts on the ends of the horizontal diameter of the wheels, such that the latter rotate around their vertical axis.

The angle of deviation of the box when entering a curve is measured in relation to the longitudinal axis of the vehicle. The rotating anchor cylinder determines this deviation in degrees, beginning from 0° at the entry into the curve and increasing to a maximum value at its centre, from where the values trends towards 0° once more, this being reached at the exit. At this point the angle of deviation is cancelled out, since the longitudinal axis of the vehicle now coincides geometrically with the axis of the guide track.

Measurement of the angle of deviation is achieved by means of optical sensors, such that via an integral mathematical function it is possible to know at each moment in time the angular value of the deviation, its oscillation from 0° to 0° and the radius of the curvature of the track.

Overall, and as regards its effects, the rotating and pivoting anchor sub-system is similar to the steering systems used in the automobile industry, but safer since its components are more robust and are subjected to lower dynamic stresses. It is even possible to insert "multiplication boxes" or devices to increase the sensitivity of its movement.

The simple efficiency of the device may be summarised by pointing out that it allows for orientation of the support wheels by replacing the steering box normally used in automobiles with the anchor and orientation cylinder described above.

In the present Description of the system no specific dimensions have been included, since the conceptual validity of the system is not altered when different measures are used, as long as the shapes indicated are maintained.

Detailed Explanation of Construction of Rolling Box

The central guidance system including a rolling box and a guide track described above allows for variations in its construction as regards the materials used and the dimensions of the overall assembly. This versatility does not alter the mechanical concept nor does it have any impact on operation. Referring back to FIGS. 7 and 8, the horizontal support axes 74 that cross at right angles and at whose ends are anchored the guide wheel vertical axes 76 may be rods or metallic profiles of variable cross-section. Such variation does not influence either the structural strength of the assembly or its operation.

Furthermore, certain elements may be integrated in a single part or be made up of several parts, especially the horizontal support axes, which may be rigid or articulated.

The constructional example presented here is characterised by its simplicity and may be described as the rolling guide box with central ring-threaded composite axes.

Two diagonal steel rods 74 with a circular cross-section (half shaft type) forming a geometric square of 40 centimeters per side and each divided into two equal parts are bolted to two thick rings around a vertical steel shaft that centres the assembly, allowing it to move in a scissor-like manner with a minimum angular displacement of less than one degree.

Between each set of two arms and perpendicular to the guide track 1 are installed two damping rods 81 with springs, which constitute the mechanism providing guide wheel 79 adherence and pressure regulation. These will be described below.

At opposite ends, and also threaded, are bolted four robust yokes 75 that hold the vertical shafts 76 of the guide wheels 79, located at the angles of the geometric square. This is a cross-shaped structure whose arms form angles of 90 degrees, as illustrated in FIG. 4.

This mechanism is placed between two steel plates 72 of variable thickness (20 to 30 mm), which hold the five vertical shafts of the box: one central shaft and four guide wheel shafts.

These two plates 72 are rectangular and measure 700×400 cm. They are positioned such that the longest sides are parallel to the guide tracks and protrude 5 cm from the 40×40 cm geometric square, at whose angles are the vertical guide wheel shafts.

Detailed Explanation of Construction of Rotating Anchor

The construction of the rotating anchor 3 for support wheel orientation may vary, without this implying and alteration of the structural or functional concept. However, basically there are two construction modes that are clearly differentiated on the basis of the shape and dimensions of the central shaft or anchoring pivot. These are detailed below:

a) anchor with single central shaft. This is a single steel shaft that runs through the rolling guide box and the anchoring and orientation cylinder fixed to the upper plate, the threaded end of which is housed in the frame or chassis of the vehicle. The shaft is common to the box and its anchoring device.

b) anchor with shaft made up of two independent parts. These two shafts are different but are aligned vertically in the geometric centre of the box:

1) Rolling box shaft. This element has its own axis that serves as a shaft for the yokes supporting the guide wheels and has no independent movement. It is a shaft that rotates with the box.
2) Rotating anchor cylinder shaft. This serves as a support for the cylinder by means of a bearing located at its lower base. It runs vertically through the cylinder and is fixed to and immobilised by the frame of the vehicle. This shaft does not rotate; it is a pivot around which the anchor cylinder rotates, joined firmly to the box.

This last type of anchoring device, with a shaft made up of two independent parts, will be used as an example model, since its graphic description will allow its structure and operation to be easily visualised, due to its being disassociated from other elements of the rolling box system.

Referring back to FIGS. 9 and 10, the anchor and orientation cylinder 91 is a steel part measuring 200 mm in diameter and 200 mm in height. It has a central bore of 70 mm allowing for insertion of the pivoting shaft, which is centred by means of two axial bearings 93 housed at the upper and lower ends of the cylinder. At its lower end it is fitted with a flange measuring 25 mm in width and 50 mm in height. This has a series of drill-holes allowing it to be bolted to the upper plate of the box, such that the latter rotates along with the cylinder around the anchoring shaft.

The central shaft or anchoring pivot 92 is a cylindrical element measuring 70 mm in diameter which at its lower end has a flange measuring 35 mm in width and 25 mm in height, this serving as a seat for the bearing on which the orientation cylinder rests. The length of this element is greater than that of the cylinder through which it passes, and it extends in the form of a threaded end part that anchors the assembly and allows it to be regulated in height. The centre of this pivot is aligned geometrically with the rolling box shaft.

The toothed collar or circular rack 94 is a steel ring that wraps around the outer face of the anchor cylinder and that is located at a height adequate for it to be coupled to the gears (pinions or toothed wheels) of the support wheel steering (orientation) system.

Figure 11:
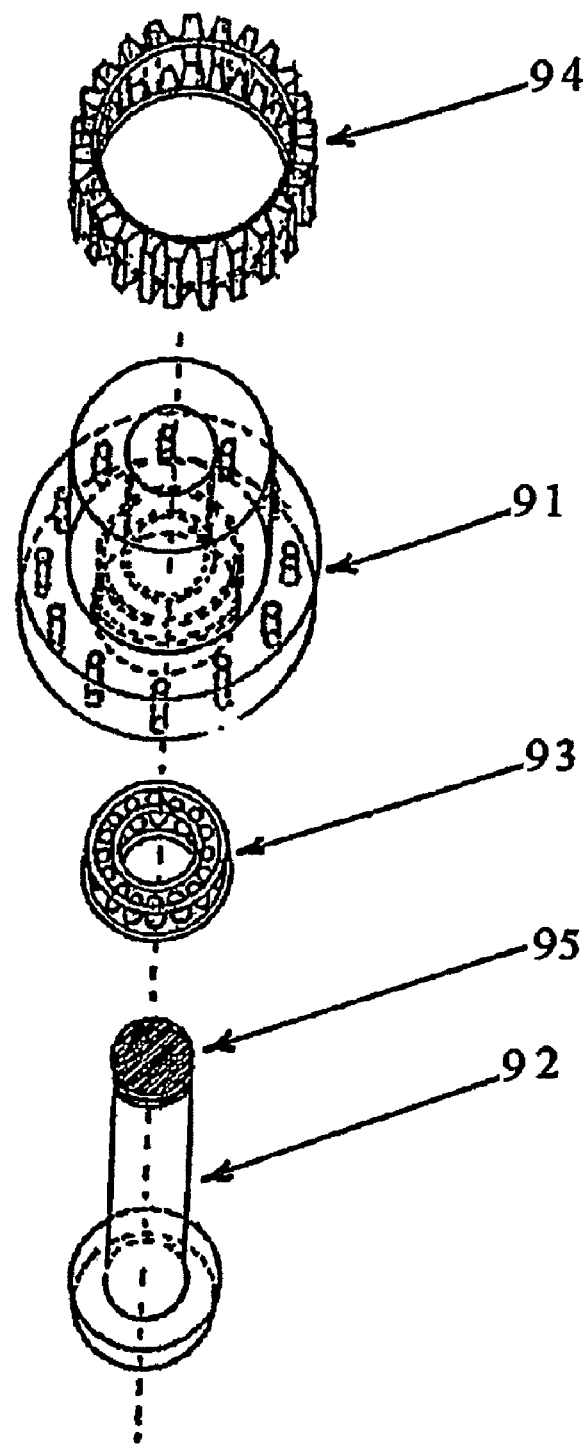
FIG. 11 is an axonometric exploded view showing exemplary elements of the rotating anchoring sub-system.
Figure 12:
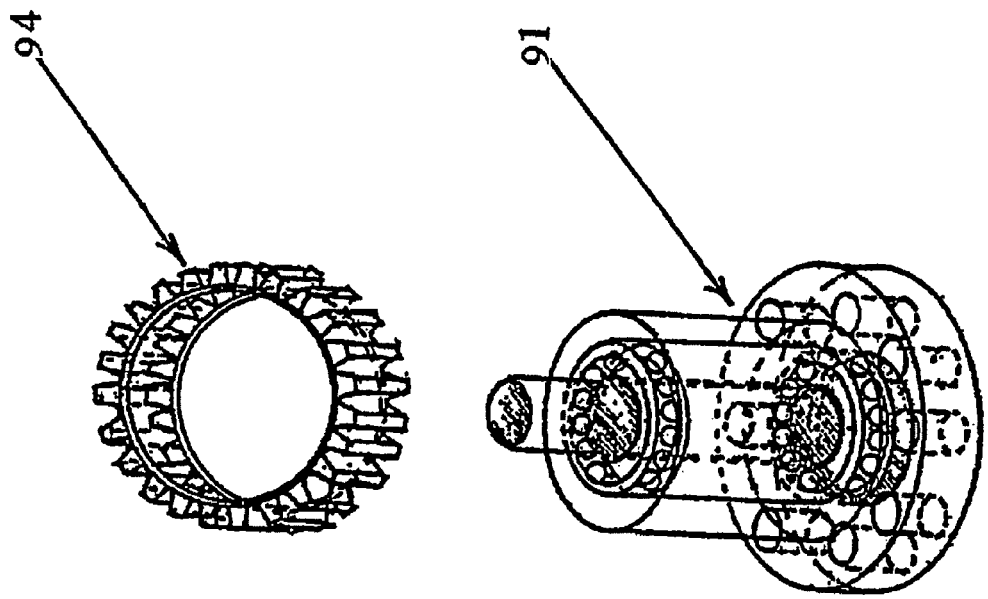
FIG. 12 is an axonometric perspective view of the rotating anchoring sub-system.

FIG. 11 is an axonometric exploded view showing the elements of the sub-system. FIG. 12 is an axonometric perspective view of the sub-system.

Figure 13:
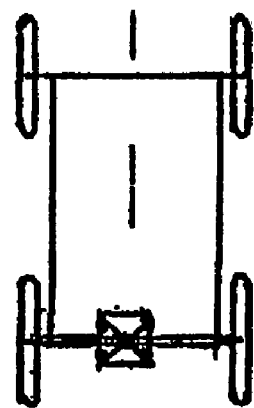
FIG. 13 is a top view showing comparatively the guidance effects of three types of anchoring: a) a rigid anchoring without orientation of axles or support wheels, b) a semi-rigid anchoring, and c) a rotating anchor (pivoting)
Figure 13:
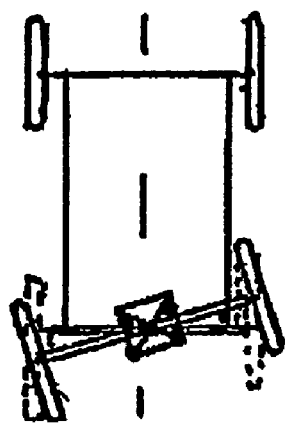
Figure 13:
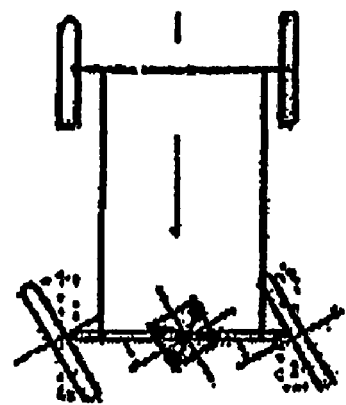

FIG. 13 is a top view showing comparatively the guidance effects of three types of anchoring: a) a rigid anchoring without orientation of axles or support wheels, b) a semi-rigid anchoring, and c) a rotating anchor (pivoting). In the rigid anchoring, the actual or theoretical axis (independent wheels) remains perpendicular to the longitudinal axis of the vehicle. This is suitable for rear axles.

As for the semi-rigid anchoring, the actual or theoretical axis rotates with the rolling box but remains perpendicular to the vertical plane of the support wheels. This allows for a slight orientation of the axle-wheel assembly by means of a crown or bearing. This is recommended for towed vehicles.

Finally, for the rotating anchor (pivoting), the rotation of the box is transmitted to the support wheels but the shaft or attachment frame remains perpendicular to the longitudinal axis of the vehicle. The guidance effect is the same as in the case of an automobile steering mechanism.

Figure 14:
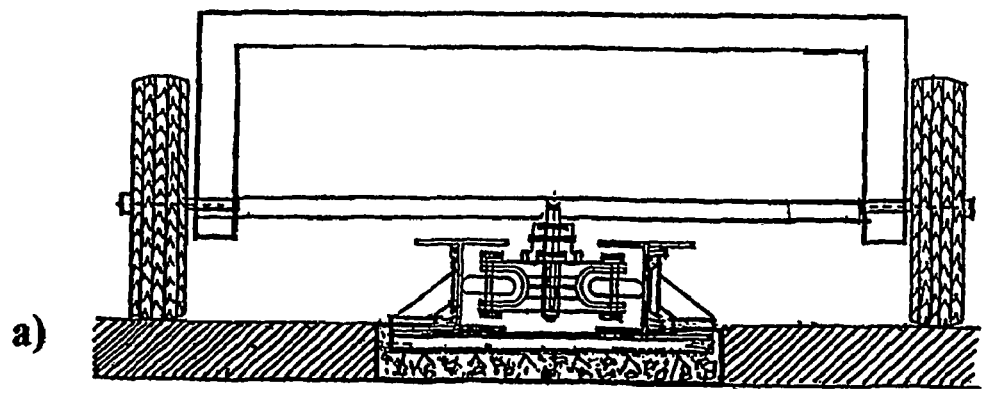
FIG. 14 is a front view showing comparatively the installation of a central rolling guide box system on a vehicle.
Figure 14:
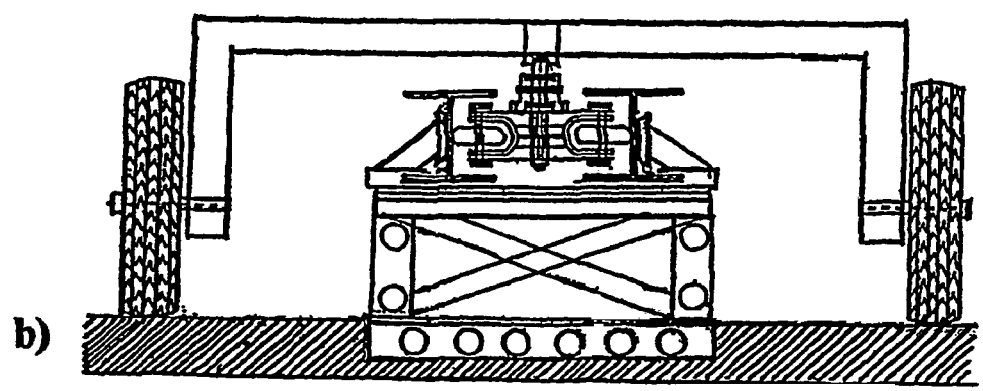
Figure 14:
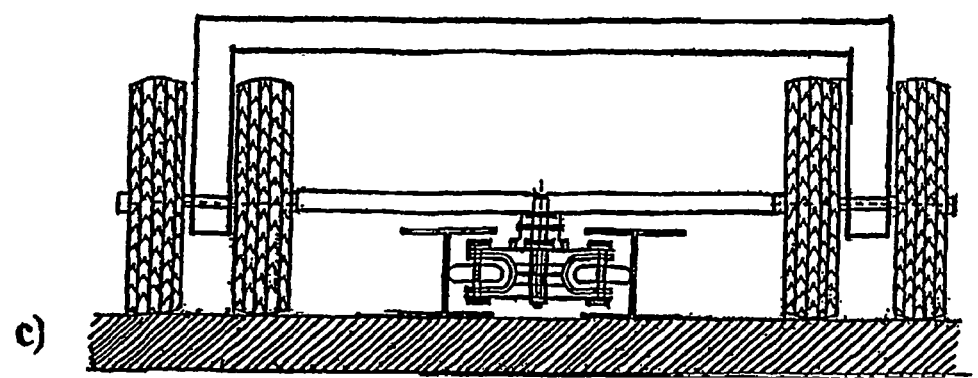

FIG. 14 is a front view showing comparatively the installation of a central rolling guide box system on a vehicle: a) Installation below the actual or theoretical axis of a front support wheel axle, b) Installation on a plinth at a level higher than that of the theoretical axis of the support wheels, and c) Installation below the actual or theoretical axis of a rear double support wheel axle.

The overall assembly is a robust and secure mechanism that converts the angular movement of the rolling box into a linear movement orienting the support wheels of the vehicle, in a manner similar to that used in the automobile industry, and allowing all the complementary mechanisms, such as propulsion, suspension, damping and braking, to be used without the need for modifications.

Both mechanisms, System and Sub-system, come together to form a strong, compact whole that is easily installed through a single anchoring operation in any guided collective transport vehicle, e.g., all types of vehicles, for freight or passengers, and any propulsion system: drive, towed or distributed traction; any type of drive coupling: bogies, axles, differentials or independent wheels; any type of support wheels: metallic or tyres, of any dimensions; any number or arrangement of wheels: pairs, with or without axles, double pairs, longitudinal or parallel positioning; and any power level, load or speed.

The current description of the System indicates that the mechanisms involved are innovative compared to the current technical state of the art in the guided transport sector to which it belongs.

It may also be deduced that the inventive activity involved in creation of the System is not the result of the technical situation existing as of this time. Finally, attention should be brought to the fact that the System is fully compatible for application to collective guided transport in the railways sector through the introduction of techniques applied in the automobile industry, giving rise to new hybrid train-automobile vehicles.

The invention claimed is:

1. An integral train guidance system comprising at least three mechanical assemblies making up a train guidance transport infrastructure, said mechanical assemblies including:
a guide track defining first and second spaced apart and opposing guideways each having a limiting wall;
a central rolling guide box sized to be positioned between said guideways and having rotary wheels opposing each of said limiting walls of said guide track; and
a wheel anchoring and orientation cylinder for securing said central rolling guide box to a vehicle,
wherein the first and second spaced apart and opposing guideways are two I-shape steel profiles each having upper and lower wings, each wing having a length the same as a length of the limiting wall,
whereby the guide track provides vertical and horizontal support for anti-derailing and anti-tilt mechanisms of the rolling guide box in a single element and provides maximum resistance to torsion and bending stresses,
wherein the lower wings of the profiles fit into recesses made in wings of two I-shape steel joists, oriented in parallel, with a separation between the limiting walls and located perpendicular to the guide track,
wherein said two joists are joined by two steel plates located parallel to the track and at its outer part and braced by two steel plates having same dimensions that intersect diagonally in a cross shape,
whereby the device is a very solid rectangular structure that ensures that an unvarying distance is maintained between the profiles of the track, keeping these profiles parallel one with respect to the other.

2. The integral train guidance system according to claim 1, wherein a coupling of sections of the guide track and its continuity are achieved by tonguing and grooving of ends of the I-shape profiles of which it is made up whereby a mechanical effect of the tonguing and grooving prevents the sections from being separated in a transverse direction, these being uncoupled only through an exertion of a traction force in a longitudinal direction and whereby the coupling mechanism allows for a rapid assembly of the track.

3. The integral train guidance system according to claim 1, wherein the system adapts to a different static and dynamic mechanical behaviour of support wheel axles depending on their position on the vehicle: rear, intermediate or front by a system including one of:
a) a rigid anchor for guidance of the vehicle without varying the position of the axle-support wheels assembly;
b) a semi-rigid anchor for allowing a minor orientation of the axle-wheels assembly with respect to a longitudinal axis of the vehicle; and
c) a rotating anchor orienting the support wheels of the actual or theoretical front axle as in the case of automobile steering systems.

4. An integral train guidance system comprising at least three mechanical assemblies making up a train guidance transport infrastructure, said mechanical assemblies including:
a guide track defining first and second spaced apart and opposing guideways each having a limiting wall;
a central rolling guide box sized to be positioned between said guideways and having rotary wheels opposing each of said limiting walls of said guide track; and
a wheel anchoring and orientation cylinder for securing said central rolling guide box to a vehicle,
wherein the first and second spaced apart and opposing guideways are two I-shape steel profiles each having upper and lower wings, each wing having a length the same as a length of the limiting wall,
whereby the guide track provides vertical and horizontal support for anti-derailing and anti-tilt mechanisms of the rolling guide box in a single element and provides maximum resistance to torsion and bending stresses,
wherein a verticality of the limiting wall of the track profile is achieved through a support provided by four steel stops including two on each of a first and a second transverse joist of a trapezoid or triangular cross-section that are seated horizontally on the first and second transverse joists and vertically on an outer face of the guide track whereby two parallel and vertical devices allow the guide track to be accurately and rapidly adjusted on a rolling platform.

5. An integral train guidance system comprising at least three mechanical assemblies making up a train guidance transport infrastructure, said mechanical assemblies including:
a guide track defining first and second spaced apart and opposing guideways each having a limiting wall;
a central rolling guide box sized to be positioned between said guideways and having rotary wheels opposing each of said limiting walls of said guide track; and
a wheel anchoring and orientation cylinder for securing said central rolling guide box to a vehicle,
wherein said wheel anchoring and orientation cylinder is a dual-effect mechanism including:
a) an anchoring or attachment of the central rolling guide box to the vehicles, and
b) an orientation of the wheels, and
c) a central bore for the pivoting axis, which is centred by means of two axial bearings, at the lower end of said bore there is a flange for bolting to the upper plate of the rolling box, such that the latter rotates along with the cylinder around the pivoting axis.

6. The integral train guidance system according to claim 5 wherein height regulation of the anchoring of the rolling box to the vehicle is provided by the variable length of the central shaft or anchoring pivot and includes a cylindrical piece fitted at its lower end with a flange serving as a seat for the bearing on which the orientation cylinder rests with a length is greater than the height of the cylinder through which it runs and it protrudes in the form of a threaded end piece anchoring the assembly to the vehicle.

7. The integral train guidance system according to claim 5, wherein conversion of an angular movement of the rolling guide box into a linear movement and its transmission to a steering mechanism of the support wheels are imparted by means of a device having a toothed collar or circular steel rack wrapping around the outer face of the anchoring cylinder, located at a height suitable for it to engage with gears of a conventional steering system used in an automobile industry.

8. An integral train guidance system comprising at least three mechanical assemblies making up a train guidance transport infrastructure, said mechanical assemblies including:
a guide track defining first and second spaced apart and opposing guideways each having a limiting wall;
a central rolling guide box sized to be positioned between said guideways and having rotary wheels opposing each of said limiting walls of said guide track; and
a wheel anchoring and orientation cylinder for securing said central rolling guide box to a vehicle,
wherein the central rolling guide box acts as an interface between the guide track and the guided vehicle, wherein the central rolling guide box is a modular structure including a set of four wheels or rollers with internal axial bearings, vertical axes of which are attached to yokes located at ends of two horizontal steel bars or shafts crossing or articulated via a central shaft as diagonals of a square or rectangle, said square or rectangle positioned between two rectangular steel plates holding five vertical shafts of the rolling box including one central shaft and four guide wheel shafts, wherein the guide wheels including two on either side protrude laterally various centimeters from the steel plates including upper and lower plates and rest tangentially on the limiting wall of the parallel I-shape profiles that make up the guide track, whereby, with a height of the central rolling guide box less than that of the limiting wall of the track profiles, the central rolling guide box is anchored centrally below the vehicle at an equal distance from the supporting wheels.

9. The integral train guidance system according to claim 8, wherein each of the guide wheels on one side is joined to one on the opposite side by means of a horizontal shaft that crosses the shaft supporting the other pair of guide wheels, thus achieving static and dynamic compensation of opposing transverse forces acting on points of tangency with the guide track and whereby the crossing of the horizontal shafts allows for a limited scissor movement compensating for and balancing the forces transmitted or withstood in directing a forward movement of the vehicle and also absorbs a dilation or wear undergone by the material, with both an isostatic and isodynamic effect.

10. The integral train guidance system according to claim 8, wherein the central shaft is a thick steel cylinder that centres the horizontal axles supporting the guide wheels and holds the upper and lower plates of the box, acting as a linking point for all the components and compensating and balancing all the forces that coincide at a geometrical centre of the rolling box.

11. The integral train guidance system according to claim 8 further comprising a double elastic anchoring of the vertical shafts of the support wheels, wherein attachment to the yokes of the horizontal shafts, with scissor movement and anchoring on the upper and lower plates by means of dampers or elastic rings absorb movements and vibrations generated during guidance.

12. The integral train guidance system according to claim 8 further comprising a pressure regulating and constant adherence mechanism of the guide wheels on the profiles of the guide track, wherein the pressure regulating and constant adherence mechanism includes a rod with an intermediate screw for lengthening or shortening in millimeters, located between the arms of the two horizontal shafts supporting the guide wheels whereby the opposite angle and at the same distance between axes a spring or damper is fitted, this maintaining the guide wheels in constant contact with the guide track.

13. The integral train guidance system according to claim 8, comprising an anti-tilt mechanism, wherein the anti-tilt mechanism includes several rollers being installed on the outer face of the upper and lower plates of the rolling box, below the wings of the guide track profiles whereby the rollers come into contact with the wings only in the event of excessive inclination of the vehicle, preventing sudden rubbing and tipping.

14. An integral train guidance system comprising at least three mechanical assemblies making up a train guidance transport infrastructure, said mechanical assemblies including:

a guide track defining first and second spaced apart and opposing guideways each guideway having a limiting wall and opposing flanges connected to the limiting wall, wherein the limiting wall and the opposing flanges form a channel shape, wherein the first and second spaced apart and opposing guideways are I-shape profiles each profile having upper and lower wings, each wing having a length the same as a length of the limiting wall, and wherein the lower wings of the profiles fit into recesses made in wings of two I-shape steel joists, oriented in parallel, with a separation between the limiting walls and located perpendicular to the guide track;

a central rolling guide box sized to be positioned between said guideways and having rotary wheels opposing each of said limiting walls of said guide track and rollers arranged and configured to engage the opposing flanges, whereby tilting of the central rolling guide box is minimized; and a wheel anchoring and orientation cylinder for securing said central rolling guide box to a vehicle.

15. The integral train guidance system according to claim 14, wherein the guide track provides vertical and horizontal support for anti-derailing and anti-tilt mechanisms of the rolling guide box in a single element and provides maximum resistance to torsion and bending stresses.

16. The integral train guidance system according to claim 14, wherein said two joists are joined by two steel plates located parallel to the track and at its outer part and braced by two steel plates having same dimensions that intersect diagonally in a cross shape.

* * * * *